United States Patent Office 3,262,876
Patented July 26, 1966

3,262,876
CLEANING ION EXCHANGE RESINS
John J. Hronas, Pittsburgh, and Joseph L. Rizzo, Pitcairn, Pa., assignors to Calgon Corporation, a corporation of Pennsylvania
No Drawing. Filed July 5, 1963, Ser. No. 293,174
6 Claims. (Cl. 210—32)

This invention relates to the cleaning of ion exchange resins, and particularly to the removal of iron deposits and other undesirable deposits from water softening equipment and other types of water handling equipment by treatment thereof with solutions of hydrofluoric acid as hereinafter described.

It is a familiar problem in the water treating arts that sodium zeolite softeners tend to accumulate such inorganic contaminants as iron, aluminum, silica, and manganese in the ion exchange bed both in chemical combination therewith and by way of particulate deposits. Such deposits also have a tendency to form on the walls of containers, pipes, and other water handling equipment. Removing deposits from both resins and equipment has long been a difficult and perplexing problem.

The generally accepted procedure prevalent in the art is to treat the system with solutions of sodium hydrosulfite. Sodium hydrosulfite, however, cannot be stored in solution since its solutions are not sufficiently stable. The sulfur content of sodium hydrosulfite has a tendency to form ferrous sulfide with the iron deposits inside the resin beads and later oxidizes to ferric sulfide, a particularly objectionable deposit. Under certain conditions, free sulfur is likely to be formed from sodium hydrosulfite in the cleaning process. Moreover, since sodium hydrosulfite is a reducing agent, which tends to linger in beads, both anion and cation, it affects the chlorine demand of the system and adds to the cost of chlorine treatment used for sanitizing purposes. Moreover, the weak acid formed by sodium hydrosulfite is not as effective as could be desired.

We have found that hydrofluoric acid performs far better than sodium hydrosulfite in the removal of iron, silica, aluminum, manganese, and other inorganic deposits from ion exchange resins. Our invention has been successful both in the laboratory and under field conditions, as will be illustrated in the following examples:

Example I

A sample of cation exchange resin was obtained from the water softener of a large paper mill in central Pennsylvania. It was very dirty, and conventional methods of removing the contaminating material, such as treatment with 5% hydrochloric acid, 2% sodium hydrosulfite, and 10% sodium chloride solutions, failed to improve the condition of various portions of the resin. Another portion of the resin was treated with a 1% hydrofluoric acid solution by passing the solution through the bed at the rate of ⅔-gallon per minute per cubic foot for about ten minutes. The resin appeared quite clean. In the laboratory fresh samples of the resin were then treated equally with 1% hydrofluoric acid and 1% sodium hydrosulfite solutions. The contamination in one-gram samples of cleaned and uncleaned resin was determined by digesting the beads in hydrochloric acid and colorimetrically analyzing the residue after dilution. Results were as follows:

MILLIGRAMS PER GRAM OF RESIN

| Contaminant | Uncleaned Resin* | Sodium Hydrosulfite Cleaned | HF Cleaned |
|---|---|---|---|
| Silica | 59.4 | 54.4 | 10.2 |
| Iron | 6.1 | 7.9 | 2.6 |
| Manganese | 0.3 | 0.3 | 0.4 |

* Not including some insoluble material.

It is apparent from the above table that the hydrofluoric acid removed about 81% of the silica and 67% of the iron based on the values for the sodium hydrosulfite-cleaned material. A considerable undetermined quantity of aluminum was also removed. Capacity tests indicated that the resin had been restored to near 100% of the rated capacity, although the small samples used rendered these results inconclusive.

Example II

Additional samples of resin from the same softener were obtained; the softener had been operating at only about 30% normal capacity. Portions of the resin were treated with a 1% solution of hydrofluoric acid at one-half pound of hydrofluoric acid per cubic foot of material for 120 minutes. The improvement in capacity appears in the following table:

| | Capacity (kg./cu. ft.) | Percent of Rating | Percent Recovered Capacity | Percent Restoration of Lost Capacity |
|---|---|---|---|---|
| Standard | 21.30 | | | |
| Uncleaned Resin Col. 1 | 5.90 | 27.7 | | |
| Uncleaned Resin Col. 2 | 5.93 | 27.8 | | |
| Cleaned Resin Col. 3 | 17.06 | 80.2 | 52.5 | 72.7 |
| Cleaned Resin Col. 4 | 17.58 | 82.6 | 54.8 | 75.9 |

Capacities were determined at a regeneration level of seven pounds of brine per cubic foot of material with an exhausting solution of 500 parts per million hardness calculated as $CaCO_3$.

Example III

A 1% solution of hydrofluoric acid at one-half pound per cubic foot for 120 minutes was used to clean a sample of a strong base anion exchange resin which had a capacity before cleaning of 88% of rating and which after cleaning had a capacity of 94% of rating, equivalent to about 50% restoration of lost capacity.

Example IV

A sulfonated polystyrene-divinylbenzene cation exchange resin bed in a commercial softener having a bed volume of 87 cubic feet was treated with a 1% solution of hydrofluoric acid for 2¼ hours. The solution was not circulated but the bed was air lanced several times to insure complete distribution of the acid. After rinsing and regeneration, the bed performed at an improvement of 26% of rated capacity on the first run and on the second run, the improvement was about 14.6% or a recovery of 24.9% of the lost capacity.

Example V

A large commercial cation exchange resin softener containing contamination high in silica, aluminum, and iron was cleaned in the following manner. Initially, a 2% solution of sulfuric acid was passed through the softener to convert the resin to the hydrogen form. It was then briefly rinsed and subsequently soaked for 2½ hours in a 1% solution of hydrofluoric acid, during which time the bed was air lanced at intervals of about 20 minutes. The free mineral acidity of the cleaning solution was monitored throughout, and it was attempted to maintain the value of 500 equivalents per milliliter of free mineral acidity by adding sulfuric acid. After rinsing, the bed exhibited almost 100% of its rating in capacity. At a later date, the resin was cleaned again with a 5% HF solution at a level of two pounds of material per cubic foot of resin. Iron content, which was relatively small, was reduced about 35%, aluminum content was reduced about two-thirds, and silica content about 70%.

*Example VI*

Samples were received of resin from softeners known as units 2, 3, 4 and 5 of a commercial installation. The material in units 2 and 3 was a mixture of polystyrene-divinylbenzene "IR-120," a phenolic "RC-12," and carbonaceous "RF-20." The material in units 4 and 5 was a medium capacity polystyrene-divinylbenzene bead. In each case the resin was first regenerated with brine and then converted to the hydrogen form with 2% $H_2SO_4$. It was then soaked for two hours with air agitation in 5% hydrofluoric acid solution in quantity sufficient to provide two pounds of HF per cubic foot of resin. The capacity of the resin, expressed in kilograins per cubic foot, before and after cleaning is given below:

|        | Before Cleaning | After Cleaning |
|--------|-----------------|----------------|
| Unit 2 | 3.07            | 6.70           |
| Unit 3 | 9.26            | 12.12          |
| Unit 4 | 7.60            | 18.56          |
| Unit 5 | 5.34            | 15.00          |

The capacity was calculated after one complete cycle in each case.

Although we have used hydrochloric and sulfuric acids to maintain the acidity of the cleaning solution and counteract its regenerating effect, we prefer to employ excess amounts of hydrofluoric acid for this purpose, since the cleaning ability, especially with reference to iron and aluminum, their oxides and salts, and silica, appears to be peculiar to hydrofluoric acid and best results are obtained with it alone. Although we prefer to use at least a 1% solution completely immersing the resin bed for at least about 2½ hours, concentrations down to about ½% HF on resins which contain relatively small amounts of contamination have some cleaning effect provided the resin is completely converted to the hydrogen form. We have found that 5% solutions for two hours are particularly effective, especially when strength of the solution is assured by maintaining about two pounds per cubic foot of resin. The maximum strength of hydrofluoric acid will be determined partly by considerations of corrosion resistance of the pipes and containers and partly by the ability of the resin to resist digestion by the acid. We have found that ion exchange resins can normally withstand a 30% HF solution without apparent damage for a period of about fifteen minutes. The length of holding or treatment time will also be determined by considerations of corrosion and protection of the resin, and generally speaking, it will not be economical to cause a large commercial water softener to be off the line for a period as long as a day for example. So far as its ability to remove the above listed inorganic deposits is concerned, it appears that a very small amount of time is effective to a very small degree and increased effectiveness is related to increased concentration or holding time.

So far as we are able to determine, the application of 1-5% HF to conventional resin beads has no effect whatever on cross-linking. Only very minor corrosion effects have been found.

It is definitely advisable to regenerate before applying hydrofluoric acid because otherwise troublesome amounts of $CaF_2$ may be precepitated in the bed. Of course, if the bed is not first regenerated with salt and a cheap acid such as sulfuric acid, some of the economic advantage of hydrofluoric acid will be lost.

We do not intend to be limited to the above examples. Our invention may be otherwise practiced within the scope of the following claims:

We claim:
1. Method of cleaning an ion exchange resin containing inorganic contaminants of iron, aluminum, silicon and manganese compounds comprising regenerating said bed with salt brine, converting said bed to the hydrogen form with a solution of acid, and contacting said bed with a solution of hydrofluoric acid for a period of time sufficient to remove said contaminants.

2. Method of claim 1 including the step of agitating the bed during the time of contact with hydrofluoric acid.

3. Method of cleaning cation exchange materials containing inorganic contaminants of iron, aluminum, silicon, and manganese compounds comprising regenerating said cation exchange materials and contacting said cation exchange materials with a small amount of a hydrofluoric acid solution.

4. Method of cleaning cation exchange resin comprising regenerating said resin first with salt brine and then with a weak acid solution, and subsequently contacting said resin with at least ½% solution of hydrofluoric acid for at least 15 minutes.

5. Method of cleaning a cation exchange resin bed containing inorganic contaminants of iron, aluminum, silicon and manganese compounds comprising regenerating said catio exchange resin bed and then soaking said resin bed in a solution of hydrofluoric acid while agitating said resin bed with air.

6. Method of cleaning anioin exchange materials containing inorganic contaminants of iron, aluminum, silicon, and manganese compounds comprising regenerating said anion exchange materials and contacting said anion exchange materials with a small amount of a hydrofluoric acid solution.

References Cited by the Examiner
UNITED STATES PATENTS

| 2,351,160 | 6/1944 | Stone et al.    | 210—30 X |
| 3,078,224 | 2/1963 | Schulze et al.  | 210—30   |
| 3,139,401 | 6/1964 | Hach            | 210—30   |

MORRIS O. WOLK, *Primary Examiner.*

E. G. WHITBY, *Assistant Examiner.*